(12) United States Patent
Matthews

(10) Patent No.: US 12,247,774 B2
(45) Date of Patent: Mar. 11, 2025

(54) GAS GAP HEAT SWITCH CONFIGURATION

(71) Applicant: Oxford Instruments Nanotechnology Tools Limited, Oxon (GB)

(72) Inventor: Anthony Matthews, Oxfordshire (GB)

(73) Assignee: Oxford Instruments Nanotechnology Tools Limited, Oxon (GB)

( * ) Notice: Subject to any disclaimer, the term of this patent is extended or adjusted under 35 U.S.C. 154(b) by 357 days.

(21) Appl. No.: 17/798,862

(22) PCT Filed: Feb. 16, 2021

(86) PCT No.: PCT/GB2021/050375
§ 371 (c)(1),
(2) Date: Aug. 10, 2022

(87) PCT Pub. No.: WO2021/170975
PCT Pub. Date: Sep. 2, 2021

(65) Prior Publication Data
US 2023/0088083 A1  Mar. 23, 2023

(30) Foreign Application Priority Data
Feb. 25, 2020  (GB) ...................................... 2002653

(51) Int. Cl.
*F25B 9/12*  (2006.01)
*F25B 9/10*  (2006.01)
(Continued)

(52) U.S. Cl.
CPC .................. *F25B 9/12* (2013.01); *F25B 9/10* (2013.01); *F25B 9/145* (2013.01); *F25D 19/006* (2013.01);
(Continued)

(58) Field of Classification Search
None
See application file for complete search history.

(56) References Cited

U.S. PATENT DOCUMENTS 4,672,823 A * 6/1987 Benoit .................... F17C 3/085
62/50.1
4,771,823 A  9/1988 Chan
(Continued)

FOREIGN PATENT DOCUMENTS

JP  2008014878 A  1/2008
JP  2014521920 A  8/2014
(Continued)

OTHER PUBLICATIONS

Search Report issued in RU 2022124918 dated Dec. 13, 2023.
(Continued)

*Primary Examiner* — Jenna M Maroney
(74) *Attorney, Agent, or Firm* — Blank Rome LLP

(57) ABSTRACT

A cryogenic cooling system that includes a cooled plate thermally coupled to a cryogenic refrigerator, a target assembly that includes a target refrigerator configured to achieve a lower base temperature than the cryogenic refrigerator, and a heat switch assembly with one or more gas gap heat switches. The heat switch assembly has a first end thermally coupled to the cooled plate and a second end thermally coupled to the target assembly. A sorption pump is configured to control thermal conductivity across the heat switch assembly based on the temperature of the sorption pump. The sorption pump is thermally coupled to the cryogenic refrigerator by a thermal link extending from the cooled plate to the heat switch assembly, with the sorption pump positioned along the thermal link between the cooled plate and the heat switch assembly.

18 Claims, 5 Drawing Sheets

(51) Int. Cl.
*F25B 9/14* (2006.01)
*F25D 19/00* (2006.01)
*F28D 15/02* (2006.01)
*F28F 13/00* (2006.01)

(52) U.S. Cl.
CPC ........ *F28D 15/02* (2013.01); *F28F 2013/008* (2013.01)

(56) References Cited

U.S. PATENT DOCUMENTS

| | | | |
|---|---|---|---|
| 5,060,482 A | 10/1991 | Jackson | |
| 8,024,941 B2 * | 9/2011 | Mikheev | F25B 17/00 62/101 |
| 9,243,825 B2 * | 1/2016 | Mikheev | F25D 19/006 |
| 9,816,750 B2 * | 11/2017 | Batey | F25B 9/12 |
| 2010/0281885 A1 * | 11/2010 | Black | H10N 60/80 62/51.1 |
| 2015/0196221 A1 * | 7/2015 | Garside | F25D 19/006 62/126 |
| 2019/0383525 A1 * | 12/2019 | Matthews | F25B 9/10 |
| 2020/0209330 A1 * | 7/2020 | Popescu | F25B 9/10 |
| 2023/0088083 A1 * | 3/2023 | Matthews | F25B 9/10 62/610 |
| 2023/0090979 A1 * | 3/2023 | Matthews | F17C 3/08 220/560.04 |

FOREIGN PATENT DOCUMENTS

| | | |
|---|---|---|
| RU | 1 508 690 A1 | 11/1995 |
| SU | 1567854 A1 | 5/1990 |
| WO | WO-2009086430 A2 * | 7/2009 ............... F25B 9/10 |

OTHER PUBLICATIONS

International Search Report and Written Opinion from PCT/GB2021/050375 dated May 11, 2021.
GB Search Report from GB 2002653.0 dated Dec. 3, 2020.
Japanese Office Action and machine translation in English received in corresponding Japanese patent application 2022-551412, date Nov. 28, 2024.

* cited by examiner

GAS GAP HEAT SWITCH CONFIGURATION

CROSS REFERENCE TO RELATED APPLICATIONS

This application is a national stage of International Application No. PCT/GB2021/050375, filed Feb. 16, 2021, which claims priority to GB 2002653.0, filed Feb. 25, 2020.

FIELD OF THE INVENTION

The present invention relates to a cryogenic cooling system and a method for operating this system.

BACKGROUND TO THE INVENTION

Cryogenic systems generally comprise multiple stages enclosed within a vacuum chamber which are held at different temperatures during steady state operation of the system. In order to facilitate cooling from room temperature to low temperature, it is desirable to be able to thermally link the stages during a cooling process, and to thermally isolate the stages during steady state operation. Heat switches can be used to achieve this. For example, gas gap heat switches can be controlled to transfer or isolate a thermal load from one end of the switch to the other.

Gas gap heat switches comprise two conductors which are separated from each other within a chamber into which a gas can be introduced. When the switch is closed, the gas inside the chamber facilitates heat transfer between the conductors by conduction. The switch is opened by evacuating the gas from the chamber so that this heat transfer path is no longer available. The thermal conductance of the chamber containing the conductors is low compared to that of the conductors at the system operating temperature. The gas gap heat switch may therefore be considered "closed" when the thermal conductance between the two conductors exceeds that of the chamber. In an "open" state, the thermal conductance is determined by the geometry, material and temperature of the chamber, and is orders of magnitude lower than the thermal conductance in a "closed" state. The opening and closing of the switch may be controlled using a sorption pump. When the temperature of the pump decreases below a threshold transition temperature the sorption pump adsorbs gas molecules from the switch, thus opening the switch. Conversely, when the temperature of the pump rises above this transition temperature the pump desorbs these gas molecules so as to reintroduce them into the chamber and close the switch.

During a process of cooling the system from room temperature to cryogenic temperatures, the gas gap heat switches will typically remain closed to allow heat transfer between each stage. However once the sorption pump has cooled below the transition temperature, the switch will open so as to substantially thermally isolate the stages that are connected to opposing ends of the switch. This may enable each stage to then obtain a different temperature by continued operation of the system.

As will be appreciated, sorption pumps facilitate automatic control of the gas gap heat switch without the need for dedicated pumping lines and the associated equipment. Sorption pumps can therefore reduce the complexity of a system and improve its performance. However prior art systems incorporating such sorption pumps are also generally limited in terms of their potential modes of operation. For example, it may not be possible to raise the temperature of an individual stage of the system above the threshold temperature of the sorption pump without causing gas to desorb from the sorption pump. This can cause the switch to transition into a closed state, which affects system performance and limits the potential temperatures that can be achieved at each stage. The invention is set in the context of solving this problem.

SUMMARY OF THE INVENTION

A first aspect of the invention provides a cryogenic cooling system comprising: a cooled plate thermally coupled to a cryogenic refrigerator; a target assembly, wherein the target assembly comprises a target refrigerator configured to obtain a lower base temperature than the cryogenic refrigerator; a heat switch assembly comprising one or more gas gap heat switches, the heat switch assembly having a first end thermally coupled to the cooled plate and a second end thermally coupled to the target assembly; and a sorption pump configured to control the thermal conductivity across the heat switch assembly in accordance with the temperature of the sorption pump, wherein the sorption pump is thermally coupled to the cryogenic refrigerator by a thermal link extending from the cooled plate to the heat switch assembly, wherein the sorption pump is arranged at a position along the thermal link between the heat switch assembly and the cooled plate.

The thermal link advantageously provides a thermal connection between the cooled plate and the sorption pump that is independent of the heat switch assembly. This enables greater control over the temperature of the sorption pump and therefore the thermal conductivity of the heat switch assembly. For example, the cryogenic refrigerator may be used to maintain the temperature of the sorption pump below that of the one or more gas gap heat switches to which the sorption pump is connected. It is therefore possible to raise the temperature of the target assembly without unintentionally warming the sorption pump, which could otherwise cause the heat switch assembly to transition from an open state to a closed state. New modes of operation for the cryogenic system are therefore possible. For example, the temperature of the target assembly may be raised above that of the cooled plate. Furthermore because the heat switch assembly can be maintained in an open state during heating of the target assembly, this heating of the target assembly does not affect the temperature of the cooled plate.

As will be appreciated, the sorption pump is typically configured to close one or more gas gap heat switches of the heat switch assembly in response to the temperature of the sorption pump exceeding a nominal transition temperature. The nominal transition temperature may depend on the application, for example the choice of working fluid in the gas gap heat switch and adsorbing material, however it is typically between 4 and 30 kelvin, and preferably between 15 and 25 kelvin. As earlier discussed, the open state of the gas gap heat switch corresponds to a state in which the gas has been substantially or entirely removed from the gas gap heat switch so as to substantially reduce the thermal conductance between the first and second ends of the heat switch assembly. Conversely, the closed state corresponds to a state in which the gas is contained within the gas gap heat switch and facilitates a much higher thermal conductance between the first and second ends. The thermal link is preferably arranged so that the sorption pump may be maintained below the nominal transition temperature of the sorption pump during operation of the cryogenic refrigerator. In particular, the sorption pump is preferably thermally coupled to the cooled plate so as to maintain the temperature of the sorption pump below the nominal transition temperature independent of the temperature of the target assembly.

The target assembly typically comprises a target heater, such as an electrically controlled resistive heater. The target heater optionally forms part of the target refrigerator, for example as may be the case where the target refrigerator comprises a still or mixing chamber of a dilution refrigerator. The target assembly may comprise a target plate thermally coupled to the target heater and the target refrigerator. The sorption pump is preferably thermally coupled to the cooled plate so as to maintain the temperature of the sorption pump below its nominal transition temperature during operation of the target heater. Said operation of the target heater may raise the temperature of the target assembly above the nominal transition temperature of the sorption pump.

As earlier explained, even when the gas is removed from the gas gap heat switch, operation of the target heater can cause heat to conduct along the heat switch assembly and to the sorption pump. The sorption pump is typically connected to the heat switch assembly by a conduit (also referred to as a capillary), providing a fluid communication between the sorption pump and the heat switch assembly. The conduit is preferably formed from a low conductivity material, but inevitably provides a thermal connection between the heat switch assembly and the sorption pump. In the absence of the portion of the thermal link extending between the cooled plate and the sorption pump, the heat input from the target heater along the conduit could cause gas to desorb from the pump, particularly when one end of the heat switch assembly itself is warmed above the nominal transition temperature of the sorption pump. This could cause unwanted transitioning of the heat switch assembly into a closed state. However, the thermal link advantageously ensures that any heat introduced from the target assembly to the sorption pump is conducted away by operation of the cryogenic refrigerator. This facilitates high temperature operation of the target assembly.

Typically, the cryogenic refrigerator will be operated continuously during use of the cryogenic system. Nonetheless, it is desirable to be able to transition the heat switch assembly from an open state to a closed state using the sorption pump. As discussed, this generally requires the temperature of the sorption pump to be raised above its nominal transition temperature. It is preferred therefore that the system further comprises a sorption heater configured to apply localised heating to the sorption pump. For example, the sorption heater may comprise an electrically operated resistive heater provided at the sorption pump and that may be operated so as to raise the temperature of the sorption pump above the nominal transition temperature. The sorption heater may therefore be activated, typically using an electrical control system, so as to thermally couple the cryogenic refrigerator with the target assembly when desired.

The thermal link typically comprises a first connecting member and a second connecting member, wherein the first connecting member extends between the heat switch assembly and the sorption pump, and wherein the second connecting member extends between the sorption pump and the cooled plate. The first connecting member typically comprises a conduit for conveying gas between the sorption pump and one or more gas gap heat switches of the heat switch assembly. The first connecting member is preferably formed from a low conductivity material and generally has a thermal conductance below that of the second connecting member. High temperature operation of the target assembly can nonetheless cause heat to transfer to the sorption pump by conduction along the heat switch assembly and the first connecting member. The second connecting member advantageously provides a thermally conductive path along which this heat can be removed from sorption pump by operation of the cryogenic refrigerator. Unlike the first connecting member, the thermal connection formed by the second connecting member is therefore "desired" in the sense that it prevents unintentional desorption of the gas from the sorption pump.

Although some level of heat transfer along the second connecting member is desired, the thermal conductance of the second connecting member is preferably sufficiently low so that the temperature of the sorption pump can be individually controlled. For example, it may be desirable to raise the temperature of the sorption pump above that of the cooled plate by operation of a sorption heater. The second connecting member therefore preferably forms a weak thermal link. It is particularly desirable that the second connecting member has a thermal conductance between 1 and 50 milliwatts per kelvin, and preferably between 5 and 10 milliwatts per kelvin. The sorption pump can therefore be maintained below its nominal transition temperature until such a time that it is desired to close the heat switch assembly by operation of the sorption heater.

The heat switch assembly may comprise multiple gas gap heat switches. For example, one or more stages may be arranged between the cooled plate and the target assembly, wherein each stage is thermally coupled to one or more gas gap heat switches of the heat switch assembly. Each said stage may be arranged to obtain a respective base temperature during operation of the cryogenic cooling system. Furthermore, the sorption pump may be configured to open and close each said gas gap heat switch of the heat switch assembly. Alternatively, each gas gap heat switch of the heat switch assembly may be controlled using a respective sorption pump, and each said sorption pump may be thermally connected to the cooled plate by the thermal link. The system may also further comprise a gas reservoir fluidly coupled to the heat switch assembly. This gas reservoir may be controlled to introduce a predetermined quantity of gas into each gas gap heat switch of the heat switch assembly prior to the cool down of the system to cryogenic temperatures.

The system could conceivably be a "wet" system reliant upon liquid cryogens for cooling the cooled plate. For example the cryogenic refrigerator may comprise a dewar of liquid nitrogen or helium. However, it is particularly desirable that the cryogenic refrigerator is a mechanical refrigerator selected from the group comprising: a pulse tube refrigerator, a Stirling refrigerator and a Gifford-McMahon refrigerator, these having the advantage of not requiring liquid cryogens. The target refrigerator typically has a lower cooling power than that of the cryogenic refrigerator. The target refrigerator may comprise any of a helium-3 refrigerator, a still or a mixing chamber of a dilution refrigerator, or a 1 kelvin pot.

A second aspect of the invention provides a method of operating a cryogenic cooling system according to the first aspect, wherein the sorption pump is configured to thermally couple the cryogenic refrigerator with the target assembly in response to the temperature of the sorption pump exceeding a nominal transition temperature, the method comprising the following step: (a) raising the temperature of the target assembly from a first temperature below the nominal transition temperature to a second temperature above the nominal transition temperature; wherein the sorption pump is thermally coupled to the cryogenic refrigerator using the thermal link so as to maintain the temperature of the sorption pump below the nominal transition temperature throughout step (a).

The second aspect shares similar advantages as discussed in relation to the first aspect. Any of the features discussed in relation to the first aspect are equally applicable in regard to the second aspect and vice versa.

As previously discussed, the cryogenic cooling system preferably further comprises a sorption heater thermally coupled to the sorption pump. In this case the method further preferably comprises the following step: (b) operating the sorption heater so as to raise the temperature of the sorption pump above the nominal transition temperature, thereby thermally coupling the cryogenic refrigerator to the target assembly. Step (b) would be performed after step (a), as will be appreciated. Operation of the cryogenic refrigerator and subsequently the target refrigerator would then cause the stages of the system to return to their respective base temperatures.

It is generally desirable for the target assembly to further comprise a target heater, in which case step (a) may be performed by operating the target heater.

After the performance of step (a) the method preferably further comprises a step of reducing or eliminating the heat generated by the target heater.

The first and second temperatures may be selected depending on the application however in general the first temperature is typically below 5 kelvin and the second temperature is typically above 20 kelvin. The second temperature is preferably at least 30 kelvin and may be at least 100 kelvin.

BRIEF DESCRIPTION OF THE DRAWINGS

Embodiments of the invention will now be described with reference to the accompanying drawings in which.

DETAILED DESCRIPTION

Figure 1:
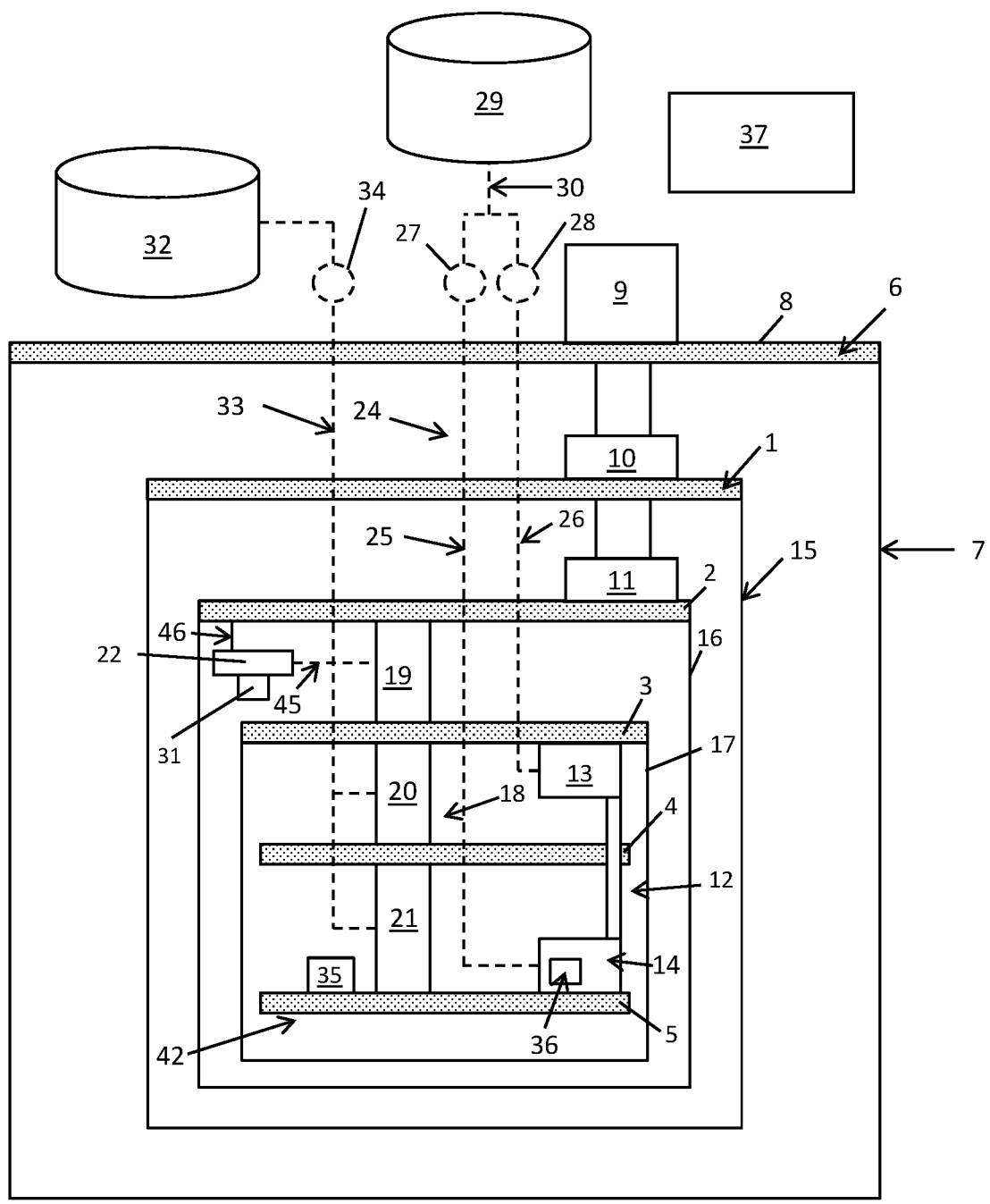
FIG. 1 is a schematic illustration of a cryogenic cooling system in accordance with a first embodiment of the invention.

A first embodiment of a cryogenic cooling system will now be described with reference to FIG. 1. FIG. 1 depicts a sectional view of the interior of a cryogen-free cooling system. The system comprises a plurality of thermal stages 1-5 and an outer stage 6 which form a tiered assembly in which the stages are aligned and spatially dispersed along a central axis. The thermal stages 1-5 are contained within a cryostat 7 mounted to the outer stage 6. The cryostat 7 is typically evacuated when in use. The outer surface 8 of the outer stage 6 is exposed to the ambient environment at room temperature and atmospheric pressure, and is generally formed from aluminium.

The cryogenic cooling system comprises cooling apparatus which cools the system from room temperature to an operational base temperature. Each thermal stage 1-5 is formed from a high conductivity material such as copper and has a different operational base temperature. In this embodiment, the cooling is achieved by use of a mechanical refrigerator and a dilution unit. The mechanical refrigerator may be a pulse-tube refrigerator (PTR), a Stirling refrigerator, or a Gifford-McMahon refrigerator. In this embodiment, the mechanical refrigerator is a PTR 9. The PTR 9 comprises a first PTR stage 10 which is thermally coupled to the first thermal stage 1 and a second PTR stage 11 which is thermally coupled to a cooled plate in the form of the second thermal stage 2. Instead of a two-stage PTR 9 (as shown), the mechanical refrigerator may alternatively have just one, or more than two, cooled stages. In this embodiment, the second PTR stage 11 forms the lowest temperature stage of the PTR 9. The sorption pump 22 is typically thermally connected to the lowest temperature stage of the PTR, as is the case in FIG. 1.

The third thermal stage 3, fourth thermal stage 4 and fifth thermal stage 5 are thermally coupled to a dilution unit 12. The third thermal stage 3 is thermally coupled to a still 13 which forms part of the dilution unit 12. The fifth thermal stage 5 is thermally coupled to a mixing chamber 14 of the dilution unit 12. The cooling of the third, fourth and fifth thermal stages 3, 4, 5 is achieved through operation of the dilution unit, in which an operational fluid is circulated around a cooling circuit 24 to reduce the temperature. The operational fluid is typically a mixture of helium-3 and helium-4. The operational fluid is pumped around the cooling circuit 24 which comprises a condensing line 25 and a still pumping line 26 using a compressor pump 27 and a turbomolecular pump 28. The operational fluid can be stored in a first storage vessel 29 and supplied to the cooling circuit 24 using a supply line 30.

In use, each of the five thermal stages 1-5 are configured to attain a different operational base temperature. Heat radiation shields can be attached to the thermal stages 1-5, wherein each shield encloses each of the remaining lower base-temperature components to reduce any unwanted thermal communication between the thermal stages 1-5. This allows the stages to attain different operational base temperatures, which represent the lowest temperature obtainable for a given component during steady-state operation of the system. In this embodiment the first thermal stage 1 is configured to reach an operational base temperature of about 50 to 70 kelvin and is mounted to a first heat radiation shield 15. The operational base temperature of the second thermal stage 2 is about 3 to 5 kelvin. The second heat radiation shield 16 is mounted to the second thermal stage 2. The operational base temperature of the third thermal stage 3 is typically 0.5 to 2 kelvin. The third heat radiation shield 17 is mounted to the third thermal stage 3. The operational base temperature of the fifth thermal stage 5 is typically 3 to 30 millikelvin. The fourth thermal stage 4 forms an intermediate stage between the third and fifth thermal stages 3, 5 and has an operational base temperature of around 50 to 200 millikelvin.

Cryogenic cooling systems such as these can be used to perform measurements at low temperatures. Typically, a sample 35 is mounted to the coldest thermal stage of the system, in this case the fifth thermal stage 5. A dilution unit 12 is used to obtain millikelvin temperatures at the fifth thermal stage 5. As part of normal operation, it will be appreciated that resistive heaters form part of a still and a mixing chamber. In this embodiment the resistive heater for the mixing chamber 14 provides a target heater 36, which is thermally coupled to the fifth thermal stage 5 and can be used to heat the sample 35. This advantageously facilitates the controlled measurement of the sample 35 with respect to temperature. The target heater 36 may be a resistive heater and can be used to raise the temperature of the fifth thermal stage 5 from the operational base temperature to a temperature of about 30 kelvin, as will be described. In an alternative embodiment, the temperature of the fifth thermal stage may be raised to over 100 kelvin through use of an additional target heater thermally coupled to the fifth thermal stage and which may be separate from the mixing chamber. The temperature of the fifth thermal stage 5 can be raised controllably, in a high temperature operation mode of the cryogenic cooling system, and can then be cooled back to its operational base temperature, as will be described.

The fifth thermal stage 5, mixing chamber 14, sample 35 and target heater 36 form a target assembly 42. The fifth thermal stage 5 is therefore also referred to herein as a "target plate". The mixing chamber 14 forms a "target refrigerator", configured to cool the target assembly 42 to a lower temperature than the second PTR stage 11. A heat switch assembly 18 provides a selectively coupleable thermal connection between the second thermal stage 2 and the target assembly 42. The heat switch assembly 18 is formed of three gas gap heat switches 19-21. The first gas gap heat switch 19 has an upper end that is connected to the second thermal stage 2, and a lower end that is connected to the third thermal stage 3. The second gas gap heat switch 20 has an upper end that is connected to the third thermal stage 3, and a lower end that is connected to the fourth thermal stage 4. The third gas gap heat switch 21 has an upper end that is connected to the fourth thermal stage 4, and a lower end that is connected to the fifth thermal stage 5.

Each gas gap heat switch comprises two conductors that are separated from each other within a low conductivity chamber into which a conductive gas can be introduced. The chamber is an annular shell formed from stainless steel, and the conductive gas used is helium. When the gas is removed from the chamber, the switch is open and these thermal stages are thermally isolated. In practice the gas gap heat switch has a thermal conductivity equal to that of the chamber in the open state, which is approximately 0.01 $Wcm^{-1} K^{-1}$ at a temperature of 10 kelvin. When there is a conductive gas within the gas gap heat switch, the switch is closed and the respective thermal stages to which it is connected at each end are thermally coupled. The thermal conductance of the closed switch is at least two orders of magnitude higher than that of the open switch.

The operation of the switch between open and closed is typically achieved using a sorption pump, and is temperature-dependent. A sorption pump comprises an adsorbent material (typically activated charcoal or a molecular sieve). When the temperature of the sorption pump 22 decreases below a threshold transition temperature (in this case about 20 kelvin), the sorption pump 22 adsorbs gas molecules from the switch, thus opening the switch. Conversely, when the temperature of the sorption pump 22 rises above this transition temperature, the sorption pump 22 desorbs these gas molecules so as to reintroduce them into the chamber and close the switch. In this embodiment, the sorption pump 22 is fitted with a temperature sensor (not shown) for monitoring purposes.

The sorption pump 22 is fluidly coupled to each gas gap heat switch 19-21 by a conduit, referred to herein as the first connecting member 45. As well as facilitating the flow of gas, the first connecting member 45 inevitably provides a thermally conductive path between the heat switches 19-21 and the sorption pump 22. Another part of the sorption pump 22 is thermally coupled to the second thermal stage 2 by a second connecting member 46, which provides a mechanical linkage between these components. The second connecting member may, for example, form a copper support for the sorption pump 22. In another embodiment, the sorption pump may be mounted to the second thermal stage using a very low thermal conductivity material, such as stainless steel. In this case the thermal connection between the sorption pump and the second thermal stage would be supplemented by a second connecting member having a relatively high conductivity, such as one or more copper wires extending from the sorption pump to the second thermal stage.

Together the first and second connecting members 45, 46 form a thermal link between the heat switch assembly 18 and the second thermal stage 2, along which the sorption pump 22 is positioned. As will later be explained, the thermally conductive path provided by the second connecting member 46 is particularly advantageous because it thermally couples the high cooling power of the second PTR stage 11 to the sorption pump 22 such that any unwanted heat introduced via the first connecting member 45 can be removed from the sorption pump 22. With this arrangement, the temperature of the target assembly 42 can be raised above the transition temperature of the sorption pump 22 without closing the heat switch assembly 18.

A localised heat source in the form of a sorption heater 31 is thermally coupled to the sorption pump 22, operation of which causes gas to desorb from the sorption pump 22. The desorption of gas closes the gas gap heat switches 19-21 and thermally couples the second to fifth thermal stages 2-5. In this embodiment the sorption heater 31 is a resistive heater.

The second connecting member 46 between the sorption pump 22 and the second thermal stage 2 provides a weak thermal coupling. The thermal conductance of the second connecting member 46 must be low enough to ensure effective heating of the sorption pump 22 by the sorption heater 31. Additionally, the thermal conductance of the second connecting member 46 must be high enough to ensure the cooling of the sorption pump 22 by the PTR 9 is achieved within a reasonable time-frame. For example, cooling the sorption pump from 30 kelvin to 5 kelvin would take less than 2 hours and preferably less than 30 minutes.

A second storage vessel 32 is configured to supply thermally conductive gas to each of the gas gap heat switches 19-21 via a gas supply line 33. The supply is controlled by operation of the gas pump 34, or under the pressure applied by the second storage vessel 32. The choice of conductive gas affects the transition temperature of the gas gap heat switch. In this example, helium-4 gas is used, and the transition temperature is typically between 4 and 30 kelvin, or preferably between 10 and 20 kelvin. In other embodiments, helium-3, hydrogen or neon gases may be used.

The cryogenic cooling system of FIG. 1 can be controlled using a control system 37. The control system 37 controls each of the parts of the system including the operation of the PTR 9, the dilution unit 12, the heaters 31, 36, pumps 27, 28, 34 and associated valves, the monitoring of sensors and the operation of other ancillary equipment to perform desired procedures. A suitable computer system is used to achieve this, although manual control is also envisaged.

Figure 2:
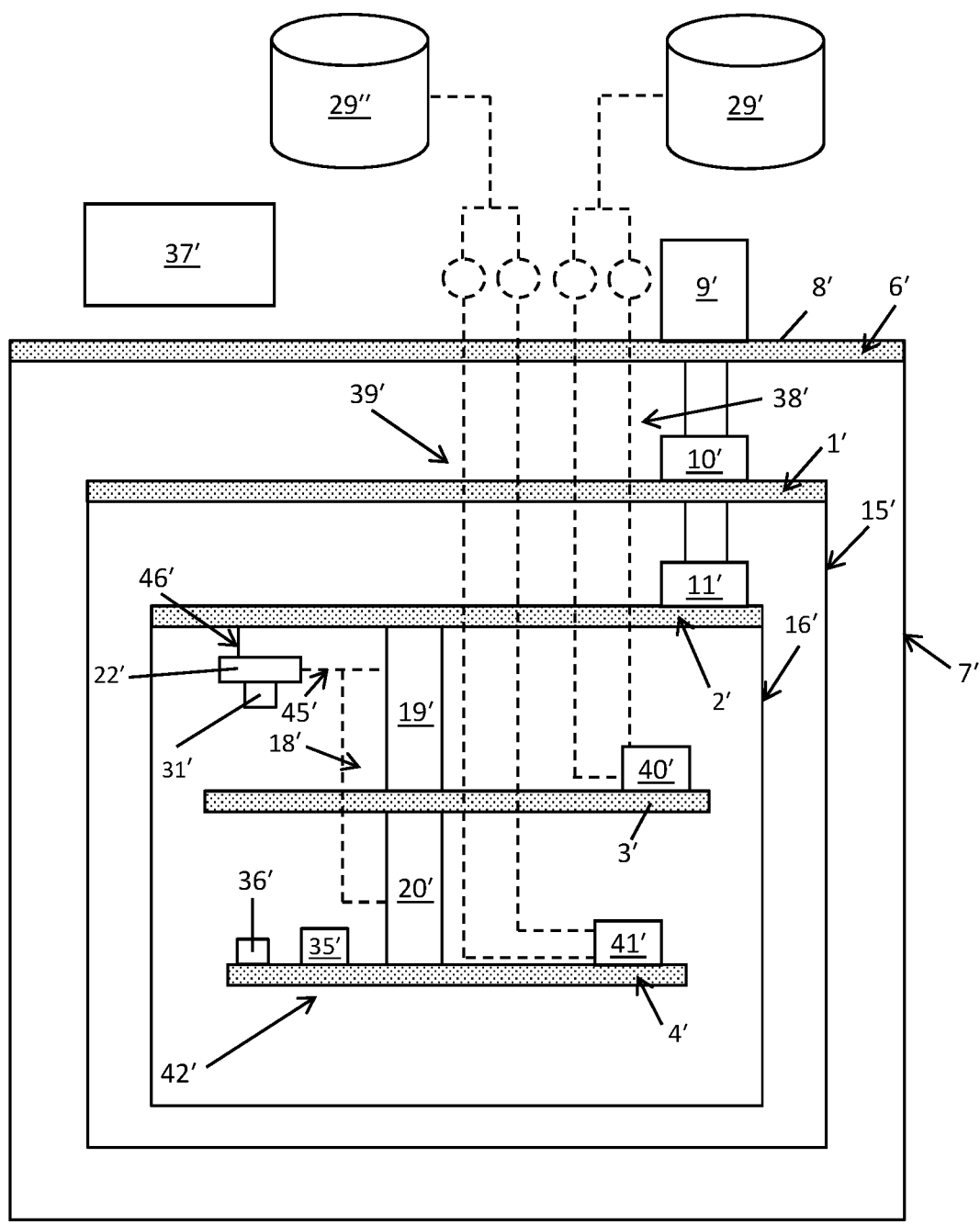
FIG. 2 is a schematic illustration of a cryogenic cooling system in accordance with a second embodiment of the invention.

FIG. 2 is a schematic illustration of a cryogenic cooling system according to a second embodiment. Primed reference numerals (e.g., the control system 37' of FIG. 2) are used to designate similar apparatus features (e.g., the control system 37 of FIG. 1). The system comprises a plurality of thermal stages 1'-4', arranged in a similar manner to the thermal stages of the first embodiment. The heat switch assembly 18' is formed of two gas gap heat switches 19', 20' connected to the second, third and fourth thermal stages 2'-4'. In this embodiment, the fourth thermal stage 4' may be considered the "target plate" of a target assembly 42', which may be thermally connected to the second thermal stage 2' using the heat switch assembly 18'. The target heater 36' is mounted to the fourth thermal stage 4'.

In this embodiment, the heat switch assembly 18' is pre-charged with helium-4 gas. The chamber connecting the heat switch assembly 18' and the sorption pump 22' is a closed system and thus, absent of any leaks, there is no requirement for a gas fill line. In other embodiments, there may be a plurality of sorption pumps provided and one or more of these may be thermally coupled to the second thermal stage 2' using a connecting member.

The cooling of the third and fourth thermal stages 3', 4' is achieved using a helium refrigerator comprising a first helium reservoir 40' and a second helium reservoir 41'. The first helium reservoir 40' is thermally coupled to the third thermal stage 3' and is configured to contain liquid helium-4, typically at an operational base temperature of around 1.3 kelvin. This is also commonly referred to as a "1 kelvin pot". The second helium reservoir 41' is thermally coupled to the fourth thermal stage 4'. The second helium reservoir 41' forms part of the "target refrigerator" in this embodiment and is configured to contain liquid helium-3, typically at an operational base temperature of around 0.3 kelvin. The first and second helium reservoirs 40', 41' are coupled to first and second cooling circuits 38', 39' respectively through which the helium is pumped. The fluids can be stored in and supplied from external reservoirs 29', 29''.

Although the embodiments of FIGS. 1 and 2 depict the use of cryogen-free cryogenic refrigerators 9, 9', alternative embodiments may instead relate to "wet" systems incorporating a reservoir of liquid cryogens for applying cooling to the thermal stage to which the sorption pump is thermally linked.

Figure 3:
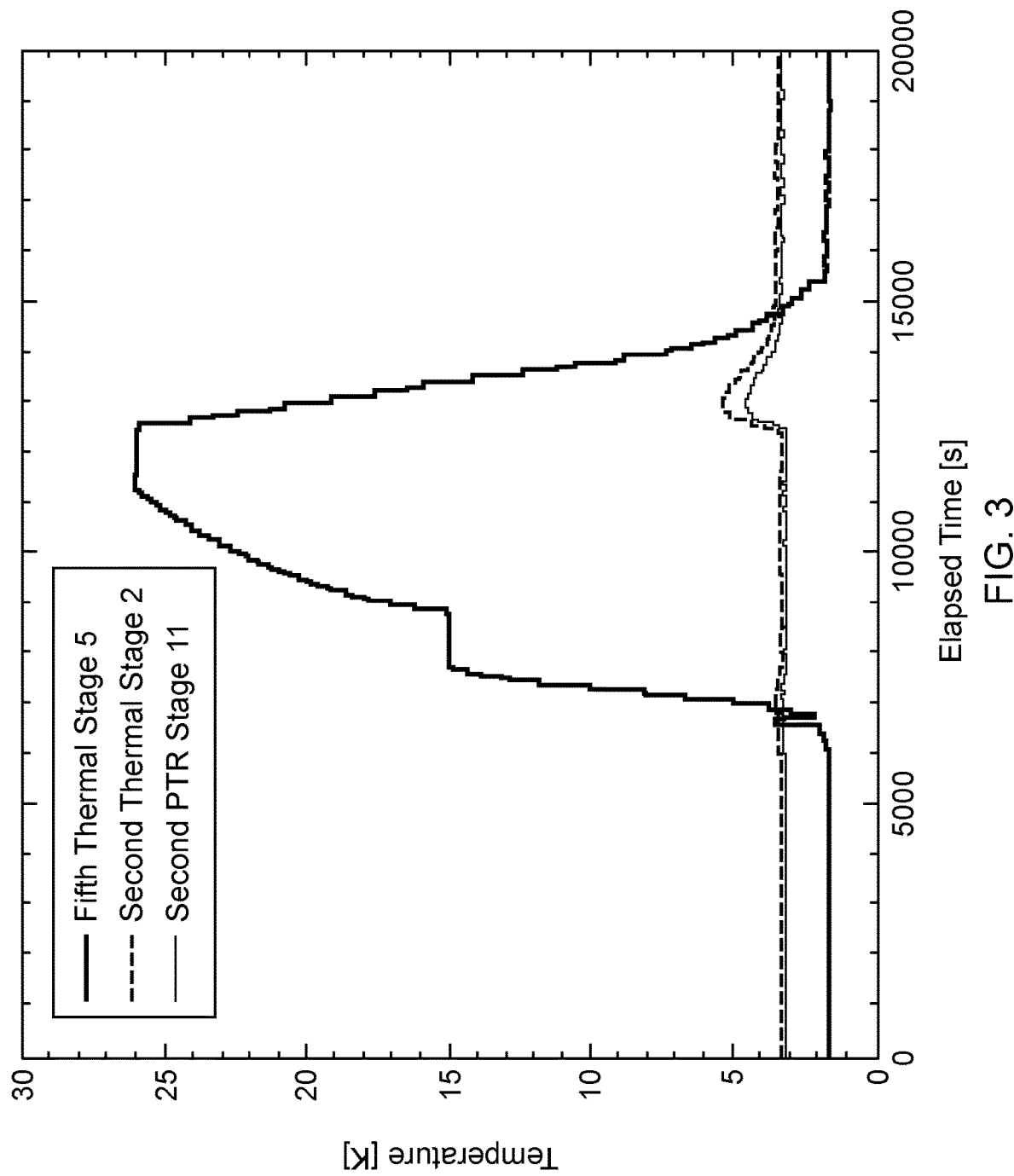
FIG. 3 is a graph showing a first exemplary temperature profile for components of the cryogenic cooling system according to the first embodiment of the invention during operation.

FIG. 3 is a graph showing the change in temperature over time during a first high temperature experiment performed on a cryogenic cooling system according to the first embodiment of the invention. The graph illustrates the change in temperature of the fifth thermal stage 5, the second thermal stage 2, and the second PTR stage 11 during a high temperature experiment. Operation of the cryogenic cooling system during a high temperature experiment will be described below, with reference to components of the system from FIG. 1.

As can be seen in FIG. 3, between an elapsed time of 0 and 6000 seconds the system is in steady state operation with each component at its operational base temperature. During this time, the gas gap heat switches 19-21 are open, and so the second thermal stage 2 is thermally isolated from the fifth thermal stage 5. The second PTR stage 11 is thermally coupled to the second thermal stage 2 and this can be seen by the similarity in temperature profile between the second PTR stage 11 and the second thermal stage 2 throughout the measurement period of 0 to 20000 seconds. The fifth thermal stage 5 is thermally coupled to the mixing chamber 14, and an operational fluid is in circulation around the cooling circuit 24 of the dilution unit 12 to provide cooling to the fifth thermal stage 5. Although, the temperature of the fifth thermal stage 5 is illustrated as being around 1.5 kelvin between an elapsed time of 0 and 6000 seconds, this is only because the actual temperature is below the minimum temperature reliably recordable for that temperature sensor. In fact, the temperature of the fifth thermal stage 5 will be its operational base temperature, which is around 3 to 30 millikelvin.

The cryogenic cooling system is switched from steady state operation to high temperature operation at an elapsed time of around 6000 seconds. In particular, the control system 37 is used to operate the target heater 36 to raise the temperature of the fifth thermal stage 5 to 15 kelvin. The operational fluid which is circulated around the cooling circuit 24 during steady state base temperature operation is collected and stored in the first storage vessel 29 during high temperature operation. It is notable that although the operation of the target heater 36 causes the temperature of the fifth thermal stage 5 to rise sharply, the temperature of the second thermal stage 5 and second PTR stage 11 are substantially unperturbed by this heating. This is because the sorption pump 22 is kept below the transition temperature by the cooling power of the second PTR stage 11, which is thermally coupled to the sorption pump 22 by the second connecting member 46. By keeping the sorption pump 22 below the transition temperature, the gas gap heat switches 19-21 are maintained in the open condition.

At an elapsed time of around 7500 seconds, the temperature of the fifth thermal stage 5 is maintained at 15 kelvin for around 1500 seconds. An advantage of optional high temperature operation of a cryogenic cooling system is the ability to take measurements, for example of a sample 35, across a wide range of temperatures. The cryogenic cooling system of the first embodiment enables operators to raise the temperature of the target assembly 42 from millikelvin temperatures to tens of kelvin in a controllable manner, meanwhile maintaining operation of the cryogenic refrigerator. Prior art systems typically do not cover this range, and as such this cryogenic cooling system provides further flexibility to take measurements at low temperature. Suitable experiments to be performed across a range of temperatures include transport measurements, and pressure cells experiments. Typically, alongside temperature control, these experiments can be performed as a function of changing electrical and magnetic fields. In order to be able to perform a repeatable experiment, the system must be configured to controllably adjust the sample temperature. This may require the temperature to be maintained at a chosen value for a period of time during which measurements of the sample 35 can be taken, as is exemplified by FIG. 3.

At an elapsed time of around 8800 seconds, the temperature of the fifth thermal stage 5 is raised to 26 kelvin, where it is held approximately constant between 11100 and 12500 seconds. The temperature control is achieved through operation of the target heater 36. During this time, despite the heat switch assembly 18 being in an open state, some heat will inevitably be conducted along the chamber of the gas gap heat switches 19-21 and the first connecting member 45 to the sorption pump 22. In the absence of the second connecting member 46, this heat could raise the temperature of the sorption pump to or above the transition temperature for the sorption pump 22 (which is around 20 kelvin). Consequently, gas molecules would desorb from the sorption pump 22 and the heat switch assembly 18 would begin to transition to a closed state. The second connecting member 46 advantageously provides a thermally conductive path along which this "unwanted" heat can be removed from the sorption pump 22. This is achieved by thermally connecting the sorption pump 22 with the high cooling power provided by the second PTR stage 11. This prevents the gas from desorbing and maintains the heat switch assembly 18 in an open state for as long as desired.

In order to return the cryogenic cooling system to its operational base temperature, the sorption heater 31 is operated at an elapsed time of around 12500 seconds such that the heat switches 19-21 close and thermally couple the second thermal stage 2 to the third, fourth and fifth thermal stages 3, 4, 5. The target heater 36 is also deactivated. The deactivation of the target heater is typically performed effectively simultaneously with the operation of the sorption heater. The rise in temperature of the second PTR stage 11 and the second thermal stage 2 between a time period of 12500 and 14500 seconds is a result of the initial heat load placed on these components by the target assembly.

Closing the heat switch assembly causes a rapid decrease in the temperature of the fifth thermal stage 5, as observed between the time period of 12500 and 14500 seconds. The operation of the target heater is terminated at around 12500 seconds so as to remove the heat input to the target assembly and reduce this cool down time. In this embodiment, the sorption heater 31 is operated so as to maintain the heat switch assembly 18 in the closed state until the temperature of the target assembly decreases to that of the second PTR stage 5. This occurs at around 14500 seconds. At this time the sorption pump 22 is allowed to cool below the transition temperature so as to thermally isolate the second thermal stage 2 from the fifth thermal stage 5.

Although the second connecting member 46 provides an important thermal connection between the sorption pump 22 and the second thermal stage, it is itself formed to have a relatively low thermal conductance by selection of material and geometry. For example, if a high conductivity material such as copper is used, a small area to length ratio would be chosen to lower the thermal conductance, and if a low conductivity material such as stainless steel or brass is used, a larger area to length ratio would be chosen. The second connecting member 46 may have a thermal conductance of 8 mW/K at a temperature of approximately 4 kelvin. This ensures that the temperature of the sorption pump 22 can be varied independently of the temperature of the second thermal stage 2, as occurs during operation of the sorption heater 31. Despite having a low thermal conductivity, the second PTR stage 11 will cool the sorption pump 22 below its transition temperature in the absence of any warming influence from the sorption heater 31. The cooling power at the second PTR stage 11 is typically in excess of 1 watt at a temperature of 4 kelvin. Operation of the sorption heater 31 will typically not raise the temperature of the second thermal stage 2 by more than 0.2 kelvin. However, when the heat switch assembly 18 transitions to a closed state the thermal load from the fifth thermal stage 5 may cause the temperature of the second thermal stage 2 to rise further, as observed in FIG. 3.

The temperature of the sorption pump 22 is maintained above its nominal transition temperature until the second to fifth thermal stages 2-5 cool to around 5 kelvin. The control system 37 is used to monitor the temperatures of the stages and automatically deactivate the sorption heater 31 and reintroduce operational fluid to the cooling circuit 24 at this stage. The operational fluid is then circulated through the dilution unit 12 to continue to cool the third, fourth and fifth thermal stages 3, 4, 5 to their respective operational base temperatures. After deactivation of the sorption heater 31, the sorption pump 22 cools from 33 kelvin to 5 kelvin in about 0.5 hours.

Figure 4:
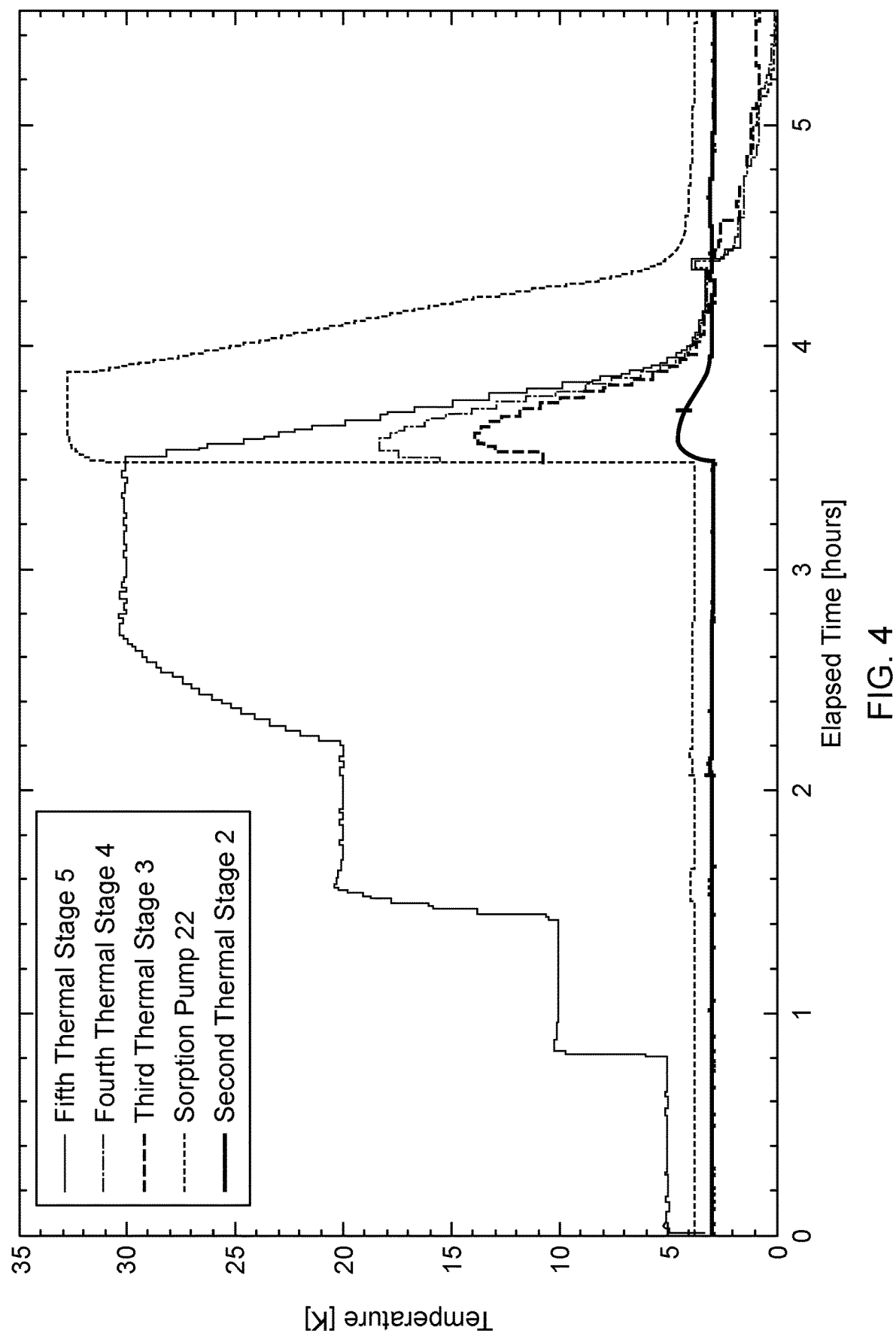
FIG. 4 is a graph showing a second exemplary temperature profile for components of the cryogenic cooling system according to the first embodiment of the invention during operation.

FIG. 4 is a graph showing the change in temperature over time during a second high temperature experiment performed on a cryogenic cooling system according to the first embodiment of the invention. The operation of the system is substantially as described in relation to FIG. 3. However, FIG. 4 provides further details of the temperatures of the fifth thermal stage 5, sorption pump 22, second thermal stage 2, third thermal stage 3 and fourth thermal stage 4 during this use.

In the example of FIG. 4, the temperature of the fifth thermal stage 5 is raised in a stepwise manner between 0 and 3 hours so that measurements can be obtained from the target assembly at each temperature interval. The size and timings of the temperature steps can be determined by a user of the system. In one embodiment the values can be pre-programmed and the high temperature experiment can be run automatically using the control system 37. Operation of the target heater 36 is controlled based on feedback data acquired from a temperature sensor on the fifth thermal stage 5 to achieve the desired temperature control of the fifth thermal stage 5. The second PTR stage 11 is thermally coupled to the second thermal stage 2 and provides continuous cooling throughout the method.

Shortly after the experiment has commenced the temperature of the fifth thermal stage is raised to 5 kelvin, where it is maintained for approximately 0.8 hours. The temperature of the fifth thermal stage 5 is then raised again to 10 kelvin, where it is maintained between 0.8 and 1.4 hours. Over a period of around 0.2 hours the temperature of the fifth thermal stage 5 is then raised to 20 kelvin, where it is kept between 1.6 and 2.2 hours. Then, over a period of around 0.6 hours, the temperature of the fifth thermal stage 5 is raised to 30 kelvin, and it is kept at this temperature for a further 0.8 hours. Once again, despite raising the temperature of the target assembly significantly above the transition temperature of the sorption pump 22, the sorption pump 22 is kept below the transition temperature due to the cooling influence of the second PTR stage 11 via the second connecting member 46. This keeps the heat switch assembly 18 in an open state and thus operation of the target heater 36 does not influence the temperature of the second thermal stage 2. The temperature of the third and fourth thermal stages 3, 4 is not shown in FIG. 4 between the elapsed time of 0 and 3.5 hours because the corresponding temperature sensors were inactive during this time. However, it is expected that the third and fourth thermal stages 3, 4 would have remained in the range of 0.5-2.5 kelvin.

In order to initiate the cooling process following the high temperature operation of the cryogenic cooling system, the control system 37 is used to raise the temperature of the sorption pump 22 to approximately 33 kelvin by operating the sorption heater 31. This occurs at an elapsed time of around 3.5 hours, when the temperature sensors for the third and fourth thermal stages 3, 4 are also activated. The operation of the target heater 36 is terminated essentially simultaneously or shortly afterwards so as to allow the fifth thermal stage 5 to cool. In another embodiment, the target heater 36 is switched off before the temperature of the sorption pump 22 is raised.

Operation of the sorption heater 31 and the resulting thermal connection between the target assembly and the remaining thermal stages rapidly raises the temperature of each of the second, third and fourth thermal stages 2-4, to a maximum of around 4.5 kelvin, 14 kelvin and 18 kelvin respectively at an elapsed time of around 3.6 hours. After that, with the heat switch assembly 18 closed, the temperature of each of these thermal stages then reduces under the cooling influence of the second PTR stage 11.

When the temperature of each of the third, fourth and fifth thermal stages 3, 4, 5 reaches approximately 5 kelvin, the sorption heater 31 is turned off. The sorption pump 22 is then cooled below the transition temperature by the second PTR stage 11 so as to transition the heat switch assembly 18 to an open state.

The increase in temperature of the fifth thermal stage 5 visible at 4.4 hours is a result of the target refrigerator circuit being started and the initial condensation of the helium mixture back into the dilution refrigerator. Once the mixture is condensed, the temperature of the target refrigerator then cools below that of the second PTR stage 11. This causes the temperature of the third, fourth and fifth thermal stages 3, 4, 5 which are thermally coupled to the dilution unit 12 to decrease until the respective operational base temperatures are reached.

Figure 5:
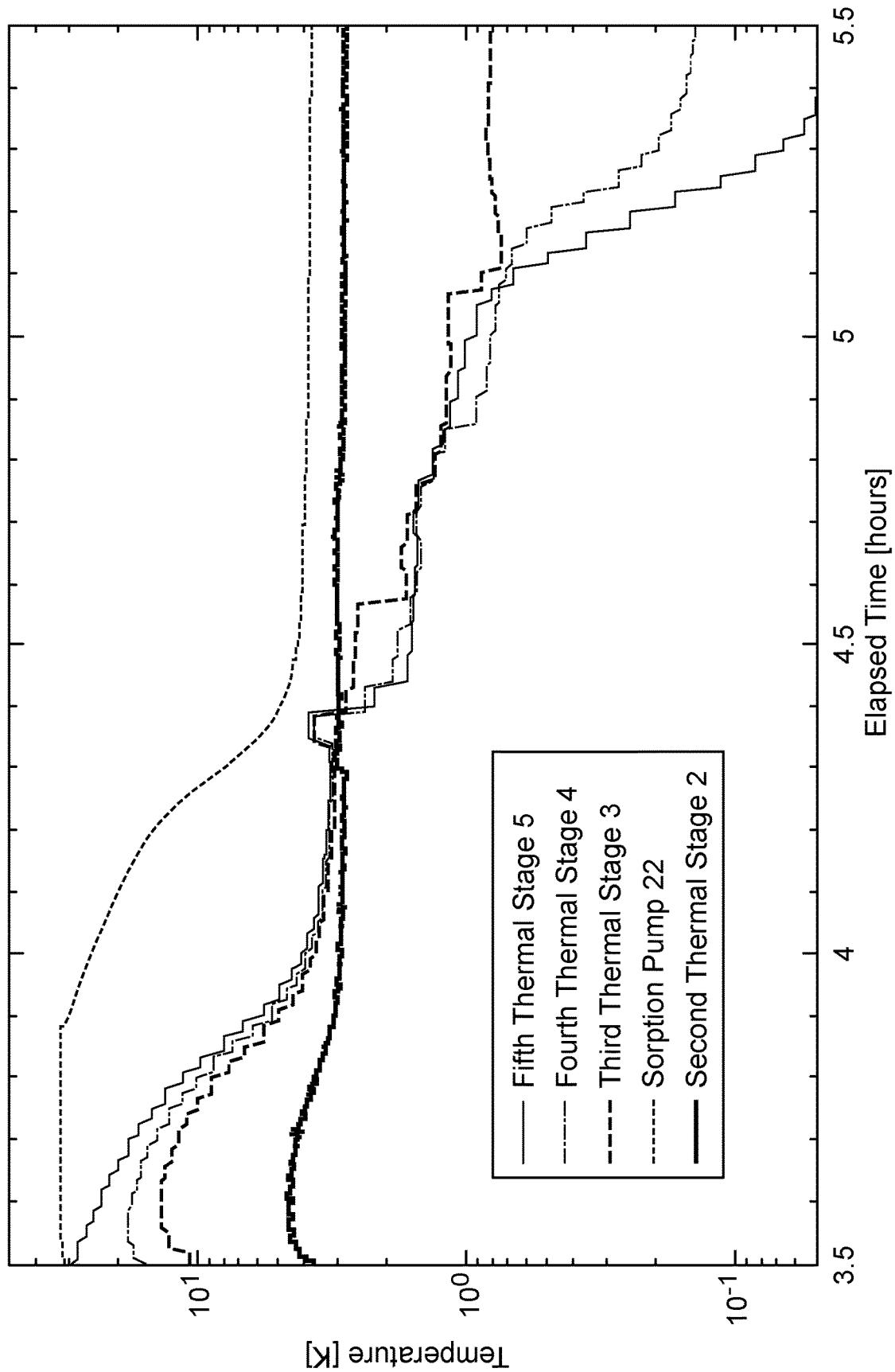
FIG. 5 is a graph showing a region of the temperature profile from FIG. 4 between 3.5 and 5.5 hours.

FIG. 5 is a graph showing the temperature profile between the elapsed time of 3.5 and 5.5 hours for the experiment shown in FIG. 4. Unlike FIG. 4, the y-axis of FIG. 5 is shown on a logarithmic temperature scale in order to more clearly show the temperatures of different thermal stages when they span several orders of magnitude. FIG. 5 indicates the decrease in temperature for each component of the system as it is returned to its respective operational base temperature.

In conclusion it will be appreciated that an improved cryogenic cooling system is therefore provided in which a sorption pump is thermally coupled to a cryogenic refrigerator. As the operation of the gas gap heat switches is dependent on the temperature of the sorption pump, the gas gap heat switches can be controllably opened and closed independent of any heat that may be conducted to the sorption pump from the heat switch assembly. In turn, a target assembly connected to one end of the heat switch assembly can be operated at elevated temperatures without raising the temperature of the remaining stages of the system.

The invention claimed is:

1. A cryogenic cooling system comprising:
a cooled plate thermally coupled to a cryogenic refrigerator;
a target assembly, wherein the target assembly comprises a target refrigerator configured to obtain a lower base temperature than the cryogenic refrigerator;
a heat switch assembly comprising one or more gas gap heat switches, the heat switch assembly having a first end thermally coupled to the cooled plate and a second end thermally coupled to the target assembly; and
a sorption pump configured to control the thermal conductivity across the heat switch assembly in accordance with the temperature of the sorption pump, wherein the sorption pump is thermally coupled to the cryogenic refrigerator by a thermal link extending from the cooled plate to the heat switch assembly, wherein the sorption pump is arranged at a position along the thermal link between the heat switch assembly and the cooled plate;
wherein the thermal link comprises a first connecting member and a second connecting member, wherein the first connecting member extends between the heat switch assembly and the sorption pump, and wherein the second connecting member extends between the sorption pump and the cooled plate; and
wherein the first connecting member comprises a conduit for conveying gas between the sorption pump and one or more gas gap heat switches of the heat switch assembly.

2. A cryogenic cooling system according to claim 1, wherein the sorption pump is configured to close one or more gas gap heat switches of the heat switch assembly in response to the temperature of the sorption pump exceeding a nominal transition temperature, and wherein the sorption pump is thermally coupled to the cooled plate so as to cool the temperature of the sorption pump below the nominal transition temperature during operation of the cryogenic refrigerator.

3. A cryogenic cooling system according to claim 2, wherein the sorption pump is thermally coupled to the cooled plate so as to maintain the temperature of the sorption pump below the nominal transition temperature independent of the temperature of the target assembly.

4. A cryogenic cooling system according to claim 2, wherein the nominal transition temperature is between 4 and 30 kelvin.

5. A cryogenic cooling system according to claim 2, wherein the target assembly comprises a target plate thermally coupled to a target heater and the target refrigerator, wherein the sorption pump is thermally coupled to the cooled plate so as to maintain the temperature of the sorption pump below the nominal transition temperature during operation of the target heater.

6. A cryogenic cooling system according to claim 5, wherein said operation of the target heater raises the temperature of the target plate above the nominal transition temperature.

7. A cryogenic cooling system according to claim 1, wherein the target assembly comprises a target plate thermally coupled to a target heater and the target refrigerator.

8. A cryogenic cooling system according to claim 1, wherein the sorption pump is configured to open and close each said gas gap heat switch of the heat switch assembly.

9. A cryogenic cooling system according to claim 1, further comprising a sorption heater configured to apply localised heating to the sorption pump.

10. A cryogenic cooling system according to claim 1, wherein the second connecting member has a thermal conductance between 1 and 50 milliwatts per kelvin.

11. A cryogenic cooling system according to claim 1, further comprising one or more stages arranged between the cooled plate and the target assembly, wherein each stage is thermally coupled to one or more gas gap heat switches of the heat switch assembly.

12. A cryogenic cooling system according to claim 1, wherein the cryogenic refrigerator is a mechanical refrigerator selected from the group comprising: a pulse tube refrigerator, a Stirling refrigerator and a Gifford-McMahon refrigerator.

13. A cryogenic cooling system according to claim 1, wherein the target refrigerator comprises any of a helium-3 refrigerator, a still or a mixing chamber of a dilution refrigerator, or a 1 kelvin pot.

14. A method of operating a cryogenic cooling system comprising a cooled plate thermally coupled to a cryogenic refrigerator, a target assembly comprising a target refrigerator configured to obtain a lower base temperature than the cryogenic refrigerator, a heat switch assembly comprising one or more gas gap heat switches and having a first end thermally coupled to the cooled plate and a second end thermally coupled to the target assembly, and a sorption pump configured to control the thermal conductivity across the heat switch assembly in accordance with the temperature of the sorption pump, wherein the sorption pump is thermally coupled to the cryogenic refrigerator by a thermal link extending from the cooled plate to the heat switch assembly, wherein the sorption pump is arranged at a position along the thermal link between the heat switch assembly and the cooled plate, wherein the sorption pump is configured to thermally couple the cryogenic refrigerator with the target assembly in response to the temperature of the sorption pump exceeding a nominal transition temperature, the method comprising the following step:

a) raising the temperature of the target assembly from a first temperature below the nominal transition temperature to a second temperature above the nominal transition temperature;

wherein the sorption pump is thermally coupled to the cryogenic refrigerator using the thermal link so as to maintain the temperature of the sorption pump below the nominal transition temperature during step (a).

15. A method according to claim 14, wherein the cryogenic cooling system further comprises a sorption heater thermally coupled to the sorption pump, the method further comprising performing the following step after step (a):

b) operating the sorption heater so as to raise the temperature of the sorption pump above the nominal transition temperature, thereby thermally coupling the cryogenic refrigerator to the target assembly.

16. A method according to claim 14, wherein the target assembly further comprises a target heater, and wherein step (a) is performed by operating the target heater.

17. A method according to claim 14, wherein the first temperature is below 5 kelvin.

18. A method according to claim 14, wherein the second temperature is above 20 kelvin.

\* \* \* \* \*